(12) United States Patent
Gutzeit (10) Patent No.: US 11,627,103 B2
(45) Date of Patent: Apr. 11, 2023

(54) INTERNAL MESSAGE ROUTING SYSTEM AND METHOD

(71) Applicant: LeapXpert Limited, Causeway Bay (HK)

(72) Inventor: Dmitry Gutzeit, Causeway Bay (HK)

(73) Assignee: LEAPXPERT LIMITED, Causeway Bay (HK)

( * ) Notice: Subject to any disclaimer, the term of this patent is extended or adjusted under 35 U.S.C. 154(b) by 0 days.

(21) Appl. No.: 17/715,764

(22) Filed: Apr. 7, 2022

(65) Prior Publication Data
US 2022/0231975 A1 Jul. 21, 2022

Related U.S. Application Data

(63) Continuation of application No. PCT/IB2020/060126, filed on Oct. 29, 2020.

(51) Int. Cl.
H04L 51/066 (2022.01)
H04L 51/48 (2022.01)

(52) U.S. Cl.
CPC ........... *H04L 51/066* (2013.01); *H04L 51/48* (2022.05)

(58) Field of Classification Search
CPC ............................. H04L 51/066; H04L 51/48
See application file for complete search history.

(56) References Cited

U.S. PATENT DOCUMENTS

| 5,406,557 | A | 4/1995 | Baudoin | |
|---|---|---|---|---|
| 9,338,025 | B2 * | 5/2016 | Arita | ........................ H04L 51/00 |
| 2006/0085506 | A1 | 4/2006 | Meyers et al. | |
| 2014/0304343 | A1 * | 10/2014 | Skiba | .................... H04L 51/046 |
| | | | | 709/206 |
| 2016/0182414 | A1 | 6/2016 | Mestanogullari et al. | |
| 2016/0205054 | A1 | 7/2016 | Lu et al. | |
| 2018/0097756 | A1 * | 4/2018 | Lew | ........................ G06Q 30/01 |
| 2020/0372063 | A1 * | 11/2020 | Sekar | .................... G06F 16/434 |

FOREIGN PATENT DOCUMENTS

| CN | 101390369 | 3/2009 |
|---|---|---|
| WO | 2007099497 A1 | 9/2007 |

OTHER PUBLICATIONS

International Preliminary Report on Patentability dated May 3, 2022, for PCT Application No. PCT/IB2002/060126, filed on Oct. 29, 2020, 4 pages.
International Search Report and Written Opinion dated Feb. 18, 2021, for PCT Application No. PCT/IB2002/060126, filed on Oct. 29, 2020, 7 pages.

* cited by examiner

*Primary Examiner* — Austin J Moreau
(74) *Attorney, Agent, or Firm* — Morrison & Foerster LLP (57) ABSTRACT

There is provided a system and method for routing messages received from any one of a plurality of external user accounts on any one of a plurality of different messaging applications within an entity. The system and method comprises one or more integration modules coupled to each of the plurality of different messaging applications for receiving messages via the messaging application. These messages are directed to a unique account identifier for the entity using additional address identifier information. A central messaging module is configured to receive from each of the one or more integration modules the messages via a common internal messaging protocol, and distribute the messages to at least one more internal user accounts within the entity using additional address identifier information.

21 Claims, 5 Drawing Sheets

INTERNAL MESSAGE ROUTING SYSTEM AND METHOD

CROSS REFERENCE TO RELATED APPLICATIONS

This application is a Continuation Patent Application of International Application No. PCT/IB2020/060126, filed internationally on Oct. 29, 2020, which claims priority benefit to Hong Kong Application 19131631.4, filed Oct. 29, 2019.

FIELD

The present disclosure relates to a method and system for routing messages received from multiple external communication channels or messaging applications via a common messaging platform to an identified person or role within an entity.

BACKGROUND

Communication of information has rapidly developed from voice calls between two individuals connected via a human operator establishing a dedicated telephone circuit; to today's various messaging applications or communication channels which communicate text, emoticons, images and other information to people, wirelessly, instantaneously and across countries and around the world.

Companies and organisations, especially in regulated or self-regulated environments such as financial institutions and law firms are struggling to keep up with the ever increasing number of endpoints of the various communication channels that personnel of such entities use to communicate with clients. Often personal employee accounts on various messaging platforms are used to communicate with clients leads to issues in security, auditability and lack of control over the communications from a company and organisational perspective. Sending an email or letter after receiving instructions from a client using their preferred messaging application such as We Chat™ or WhatsApp™ is impracticable, as well as being an inferior record of the back and forth communications which have transpired. This kind of traditional approach lags behind today's dynamic and fast moving communications which are routine in interpersonal communications taking place on the various messaging applications and communication channels outside the workplace.

Some forward thinking organisations have established company or organisation accounts on some of the many messaging channels which exist in an effort to facilitate communication with their clients using the same channels with which they are familiar. However, this approach merely creates a problem within an organisation or company which essentially requires certain individuals to administer such communication channels on behalf of the company, essentially as post-boxes. This arrangement may work for small organisations comprising a handful of personnel but quickly fails to scale as the organisation grows.

Accordingly, it is an object of the present disclosure to address or at least partially ameliorates at least addresses some of the above deficiencies of the prior art.

SUMMARY

Features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a system for routing messages received from any one of a plurality of external user accounts on any one of a plurality of different messaging applications within an entity, the system comprising:

one or more integration modules coupled to each of the plurality of different messaging applications for receiving messages via the messaging application wherein said messages are directed to a unique account identifier for the entity assigned thereon, a central messaging module configured to receive from each of the one or more integration modules said messages via a common internal messaging protocol, wherein said messages are distributed to at least one more internal user accounts within the entity using additional address identifier information.

Advantageously, at least a portion of the additional address identifier information is extracted from the message payload of the message sent to the unique account identifier of the entity by each messaging application, and at least a portion of the additional address identifier information may comprise text, image, sound or video data included in the payload of the message sent to the unique account identifier information of the entity.

Alternatively, at least a portion of the additional address information is provided from the originating external account of the messaging application responsive to a request issued by the one or more integration modules coupled thereto. Optionally, the request is issued by a chatbot communicatively coupled to the integration module. Alternatively, the additional address identifier information is derived from additional information provided by the external user.

Advantageously, internal user account address identifier information for internal account holders within an entity are stored in a database.

The system may store on a message server coupled to the central messaging module the or each message received from the external user accounts and sent to the at least one or more internal user accounts. The or each message transmitted from the at least one or more internal user accounts and sent to the external user accounts may also be stored on a message server coupled to the central messaging module.

The or each subsequent message received from a specific external user account of a messaging application of the plurality of messaging application may be routed according to the at least one or more internal user accounts identified for previous messages originating therefrom.

In a further aspect, there is provided a method for routing messages received from any one of a plurality of external user accounts on any one of a plurality of different messaging applications within an entity, the method comprising:

receiving a message sent to a unique address for an entity on one of the plurality of messaging applications at one or more integration modules coupled to that messaging application;

receiving at a central messaging module said message from the one or more integration modules via a common internal messaging protocol, distributing said message to at least one more internal user accounts within the entity using additional address identifier information.

At least a portion of the additional address identifier information may be extracted from the message payload of the message sent to the unique account identifier of the entity by each messaging application. Optionally, at least a portion of the additional address identifier information comprises text, image, sound or video data included in the payload of the message sent to the unique account identifier information of the entity.

Alternatively, at least a portion of the additional address information is provided from the originating external account of the messaging application responsive to a request issued by the one or more integration modules coupled thereto. The request may be issued by a chatbot communicatively coupled to the integration module.

The additional address identifier information may be derived from additional information provided by the external user.

A database may store internal user account address identifier for internal account holders on the within an entity.

Optionally, the method may include storing on a message server coupled to the central messaging module the or each message received from the external user accounts and sent to the at least one or more internal user accounts; and further comprise storing on a message server coupled to the central messaging module the or each message transmitted from the at least one or more internal user accounts and sent to the external user accounts.

The or each subsequent message received from a specific external user account of a messaging application of the plurality of messaging application may be routed according to the at least one or more internal user accounts identified for previous messages originating therefrom.

In a further aspect, there is provided a non-transitory computer readable medium for use in a message processing system of an entity, the non-transitory computer readable medium having encoded upon it instructions executable by the message processing system to perform process steps comprising:

receiving a message sent to a unique address for an entity on one of the plurality of messaging applications at one or more integration modules coupled to that messaging application;

receiving at a central messaging module said message from the one or more integration modules via a common internal messaging protocol, distributing said message to at least one more internal user accounts within the entity using additional address identifier information.

BRIEF DESCRIPTION OF THE FIGURES

In order to describe the manner in which the above recited and other advantages and features of the disclosure can be obtained, a more particular description of the principles briefly described above will be rendered by reference to specific embodiments thereof which are illustrated in the appended figures. Understanding that these figures depict only exemplary embodiments of the disclosure and are not therefore to be considered to be limiting of its scope, the principles herein are described and explained with additional specificity and detail through the use of the accompanying figures.

Preferred embodiments of the present invention will be explained in further detail below by way of examples and with reference to the accompanying figures, in which:—

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The disclosed technology addresses the need in the art for messages between users on various messaging platforms external to an entity and specific persons or groups within an entity; even though the external users may only know the overall address of the entity on a specific messaging platform. For example, a company may have a WhatsApp account, (or a WeChat account) known by an external customer, and the external customer wishes to deal directly with warranty or sales staff, the CEO or compliance staff. These individual staff members/groups within the entity may not already have separate individual accounts on WhatsApp or WeChat platform; or if such accounts exist, such accounts may be personal to the employee. It would be appreciated that separate employee based accounts may create potential compliance issues, security vulnerabilities and a loss of information when employees change organisations.

Advantageously, the present disclosure provides message routing within an entity or organisation using a common messaging protocol, for facilitating communication between external users of the entity (customers) and internal users of the entity or organisation. Messages are directed to and received from a common entity account on each respective platform. Irrespective of the external messaging platform utilised by the external users, the internal users use a common internal messaging platform and an individual account. The system and method of the present disclosure avoids the need for the external users to install any new or additional messaging platform; such users can interact with the entity on their native messaging application of their choice.

The common internal messaging platform provides the capacity for centralised internal message logging and storage across a number of entity accounts on various multiple external messaging platforms. The present disclosure also makes it unnecessary for designated individuals to manually route all messages in a mailbox for each messaging platform to designated users.

From outside the entity, external customers can communicate with a specific person or group within an entity using their own preferred messaging platform. The system and method of the present disclosure enables this communication to take place based even for an initial message; where the external party does not know the actual address of the internal user. Within the entity, the internal user does not need an account on the actual messaging platform used by the customer; with only the one company or organisation user account on the common internal platform.

In the system and method of the present disclosure, messages may be stored and archived for future reference by the entity, even if staff members change roles or leave the entity for other employers.

In an embodiment of the present disclosure therefore communication channels may be established between an external user account on separate messaging client applications supported by a dedicated backend platform specific to the messaging client in question; an entity user account on the specific messaging client applications; and an internal user/group account within the entity.

Optionally, it would be appreciated that the messaging applications could be any one or more of messaging applications, including instant messaging applications selected from the group comprising WeChat, WhatsApp, Line, Telegram, Viber, iMessage, Facebook Messenger, RCS, Short Message Service, Kakao Talk or similar. The transmission and reception of messages typically constitutes a series of messages generated in a specific time sequence, and in order to maintain coherence and logic in such a conversation generally such messages are communicated and displayed in an appropriate order, which is usually although not exclusively time series based. In the embodiment described below, it would be appreciated that the various messaging applications are likely to have different user interfaces and are based upon different underlying software frameworks or platforms that may be proprietary to that platform. Advantageously, the messaging applications may be operable on portable electronic devices such as smartphones or tablet computers as either native applications or web based applications; providing an interface to a user for receiving various types of input from the user via the hardware of the device.

It would further be appreciated that the messages may contain items of additional content above and beyond text, including documents, music files, movie files, pictures, etc. which may be embedded or otherwise included in the transmitted message. Alternatively, the message may contain identification of a file or a group of files that are stored on a remote data server accessible over a network. On receiving such a message an application may enable its user to download the file or files from the remote location. The message may, for example, include a uniform resource locator (URL) identifying the location at which the file or files are accessible over the internet. The file could be, for example, PDFs, MP3 files, audio files, video files, images etc.

Figure 1:
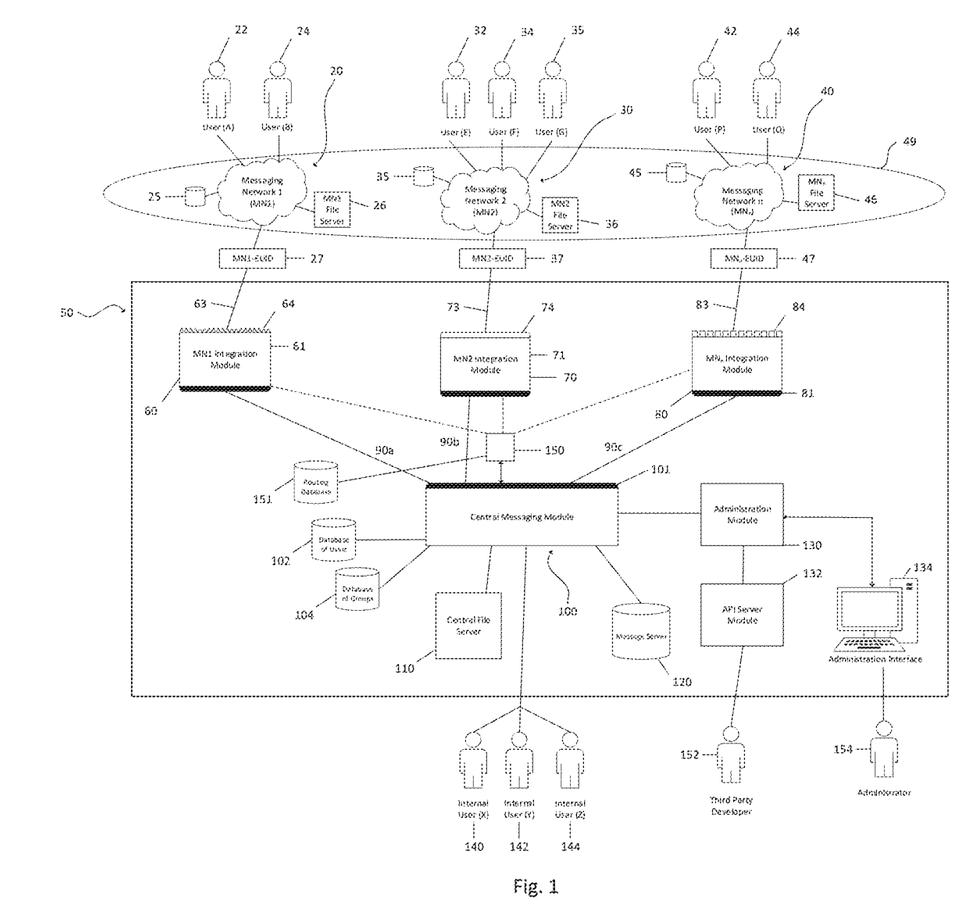
FIG. 1 depicts an exemplary schematic architecture according to a first embodiment of the present disclosure in which additional address identifier information is used to route messages received from any one of a plurality of external messaging applications to internal users using a common internal messaging protocol.

Referring to FIG. 1, there is depicted an exemplary communication system according to an embodiment of the present disclosure.

User A 22 and user B 24 have established accounts on a first messaging network 20, with unique account identifiers and contact details stored on an external database 25 controlled by that messaging network. Also associated with the first messaging network is a file server 26 on which files accessible to users of that network may be stored.

It would be appreciated that the same messaging client for a messaging network may be used by users A and B but may be operable on various types of terminal devices, including portable electronic devices or laptops or desktop computers. These devices would provide software applications which enable users to log in to their specific accounts on that messaging network and communicate messages to, from and between other users on the same messaging network/communication channel as is known in the art. For the embodiment depicted; this messaging network 20 could be WhatsApp; although it would be appreciated that this is an arbitrary designation.

Referring to the second messaging network 30, user E 32, user F 34 and user G 35 each similarly have unique messaging accounts on this messaging network with unique account identifiers and user contact details stored on the external database 35 controlled by that messaging network. These user accounts are accessible via applications operating on terminal devices such as portable electronic devices, laptops or desktop computer systems. Similarly, as with the first messaging network 20, a messaging file server 36 is associated with the second messaging network, providing the facility to store messages and files associated with or embedded with messages transmitted by, to and between users of messaging network 30. For the embodiment depicted; this messaging network could be WeChat or WhatsApp; although it would be appreciated that this again merely an arbitrary designation.

Finally, user P 42, user Q 44 operate on messaging network 40 similarly operate their user accounts on messaging applications accessible on terminal devices which may include portable electronic devices, laptops or desktops. As with the first and second messaging networks, messaging network 40 has an associated messaging network file server 46 by which files transmitted to and between members of that network may be stored, and the unique account identifiers and user contact details are stored on an external database 25 controlled by that messaging network.

It would be appreciated that the present disclosure provides a means and system by which messages between external users having accounts on each of the first messaging network 20, second messaging network 30 and third or $N^{th}$ messaging networks 40 can be communicated from and to internal users 140, 142 and 144 who have accounts on the central messaging module 100, via the operation of the communication system 10.

Advantageously, the conversation is initiated by the external user communicating with the entity user ID on that messaging platform, as depicted by Messaging Network One Entity User ID 27, Messaging Network Two Entity User ID 37 or Messaging Network Three Entity User ID 47. Subsequent transmission to a specified user of the various internal users on the central messaging platform 101 is based upon the inclusion of additional address identifier information. This information may be provided in the message (e.g. as part of the payload of the message) or in response to a manual or automatic request for additional address identifier information as is described in further detail below. The additional address identifier information may be provided in the form of text, image, sound, or video data included in the payload of the message.

According to a preferred embodiment of the present invention, a company or organisation (hereinafter referred to as an entity) may select or have assigned a messaging network entity user id (entity user account identifier) for that company on each of the communications channels (messaging applications) on which it wishes to engage with its respective clients.

This Messaging Network Entity User ID (entity user account identifier) is selected in accordance with naming conventions of the particular communications channel, and according to whatever unique names are available which uniquely specify a single specific endpoint on that communication channel. For example, MNO Company may select (or may have automatically assigned) WeChat ID MNO_2019HCKN. For the same company, for communication via WhatsApp messaging application, the unique ID associated with MNO Company is determined by the specified mobile number supplied during account creation.

Similarly, for the Line messaging application the unique User ID for MNO company/entity may be a 20 digit unique alphanumeric identifier automatically assigned or specified during the account creation process.

Where possible and assuming that desired accounts have not already been taken, it would be anticipated that the company would select a unique account identifier somewhat similar to its corporate brand name in order to assist location of the company by clients on the messaging platform, although this would by no means be mandatory.

TABLE 1

Exemplary entity account identifiers for MNO Company on various messaging platforms

| Messaging Application | Entity Account Identifier on Messaging Application |
| --- | --- |
| WhatsApp | +852 8232 8832 |
| WeChat | MNO_2019HCKN |
| Line | MNOTVCL2013s |

As such, the present disclosure provides seamless interconnection of internal staff who are able to send and receive messages via a central company account over previously separate messaging applications; rather than being constrained to a specific user account on a specific messaging network.

The messages transmitted from the internal user to the various external users of the messaging platforms as well as the messages received from the external users of the various messaging platforms may include user account details which are automatically sent may be extracted and/or processed by the respective messaging networks prior to dissemination on the central messaging network as is further discussed below.

The multi-channel communication method and system of the present disclosure is facilitated by the central messaging platform 50 which includes a first integration module 60 for coupling of the first messaging network 20 and the central messaging module 100. Similarly, a second network integration module 70 provides an interface between the second messaging network 30 and the central messaging module 100. Finally, a third or $N^{th}$ integration module 80 is depicted for providing integration between the central messaging module 100 and the $N^{th}$ messaging network 40.

Each of the respective integration modules 60, 70, 80 have interfaces 64, 74, 84 which translate commands to/from the central messaging platform 50 and the messaging network with which they are in communication. It would be appreciated that these interfaces may be communicatively coupled to the messaging network across links 63, 73, 83 via standard wired or wireless network communications. It would be appreciated that these interfaces 64, 74, 84 are implementations of the API exposed by the messaging networks for the specific networks. For example, the interface 64 could be configured to provide commands and appropriate variables to the WhatsApp API; whereas interface 74 issues commands and variables in a format compliant with the WeChat API etc.

Similarly, the various integration modules 60, 70, 80 have corresponding interfaces 61, 71, 81 for interacting with an interface 101 of the central messaging module 100. It would be appreciated that the content of these interfaces is consistent across each of the various integration modules as represented by the common interfaces 61, 71, 81.

These interfaces to the integration modules are configured for sending and receiving messages to and from the central messaging module 100 via communication links 90a, 90b and 90c which may be wired or wireless communication links without departing from the scope of the present disclosure.

Messages may be passed through interface 101 of the central messaging module 100 and are the means by which standard messaging commands and contents are transmitted from the central messaging module 100 to the corresponding integration module.

Also, in communication with the central messaging module 100 is a database of internal user accounts 102 and a database of groups 104.

The database of users and of groups refer to the association rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, again one or more physical pieces of hardware such as one or more service. It would be appreciated that the various database of internal user accounts 102 and of groups 104 include a database management system for facilitating access to the corresponding database and analysing results obtained. This database management system may be part of the integration module or may be executed on dedicated hardware without departing from the scope of the present disclosure.

It would be appreciated that the database of users contains an association between the user ID allocated upon establishment of that user ID in the central messaging platform and the relevant account holder details.

In a further aspect of the present disclosure, the internal users may also be associated with a database of groups, whereby certain of the respective users may be associated with a plurality of groups, for example, as shown in the following Table 3a, user CM001 may be associated with Group 1 and Group 2 represented by $G_1$ and $G_2$.

User CM003 may be associated with $G_1$. user CM002 may be associated with $G_2$, $G_5$. User CM004 may be associated with $G_1$, $G_2$ and $G_3$. User CM005 associated with $G_3$, $G_4$ and $G_5$ and user CM006 associated with $G_3$, $G_4$. User CM007 associated with $G_5$ and $G_1$. It would be appreciated that these associations are essentially arbitrary and many other combinations would be possible without departing from the scope of the present disclosure. (Similar resolving of the central user account identification codes to accounts on the various messaging networks could also readily be appreciated).

The corresponding table sorted by users is shown below for each of the respective groups; as Table 3a, with group IDs in Table 3b. It would also be appreciated that this group membership could be dynamically changed and administered by the central messaging module 100.

TABLE 3a

| USER | GROUP MEMBERSHIP |
| --- | --- |
| CM001 | $G_2$ |
| CM003 | $G_1$ $G_2$ $G_5$ |
| CM002 | $G_2$ $G_5$ |
| CM004 | $G_1$ $G_3$ |
| CM005 | $G_3$ $G_4$ $G_5$ |
| CM006 | $G_3$ $G_5$ |
| CM007 | $G_5$ |

TABLE 3b

| GROUP ID |
| --- |
| Group 1 - XYZ Analyst |
| Group 2 - ABC Analyst |
| Group 3 - Materials Analysts |
| Group 4 - Finance Analysts |
| Group 5 - Project Zebra |
| Group 6 - Project Alpha |

Accordingly, to address a specific individual within the company, the internal account identifier may be included within the message body; where it is essentially ignored for addressing purposes on the external messaging network. Such additional internal address information could be provided in any media format including an image, text, audio file or other data such as a Linkedin Profile link, Transmission of the message from a client device over an external network is then managed essentially without any change according to pre-existing protocols for a specified communication channel/messaging network.

The association between the internal user accounts and additional address identifier information could be stored in the internal user account database 102 or optionally in a separate routing database 151. Once received at the central messaging module 100, the inclusion of this information in the internal message body (e.g. "Dear John Smith", "Attention CEO", "Extension 560" essentially act as address "tags" within the message body) and thereby allow identification of the internal account on the common messaging platform and transmission of the message on the common internal messaging protocol thereto. Relevant messaging history with specific external accounts may also be captured as a secondary account identifier information for assistance in routing subsequent messaging dialogues after the initial dialogue has occurred.

TABLE 2

Exemplary Routing Database Information

| INTERNAL USER | Additional Address Identifier Information | Messaging History |
| --- | --- | --- |
| CM001 | John Smith, CEO, Head Honcho, ext 9200 | +852 444 5555 WhatsApp User - 21/09/2019 |
| CM002 | Bob White, VP Accounts, Ext 560 | |
| CM003 | Joyce Lee, VP Human Resources, <Picture> | |

It would be appreciated that the additional address information in the above table is text information, although it would be entirely possible that the additional address information could also comprise text, image, sound or video data.

Alternatively, it could be appreciated that the additional address identifier information could be supplied by the external user who is in contact with the company, in response to a request for information issued by a chatbot 150 or similar computer program in communication with each of the integration modules. Optionally, the chatbot 150 may be in direct communication with the database of users 102, the routing database 151 or indirectly via the central messaging module for matching additional address identifier information with respective internal user accounts as is known in the art. This externally supplied information could be supplied directly by a user; or even by a chatbot type program operating on the external user configured to supply such additional user account identifier information.

The routing database refer to the association rather than the physical manifestation thereof. As such, the "database" may refer to a logical database defining the logical structure and relationship between the above associations and may be stored across various pieces of hardware including one or more services. Alternatively, the term "database" may also refer to storage of database in an unstructured form, again one or more physical pieces of hardware such as one or more service. It would be appreciated that the database includes a database management system for facilitating access to the corresponding database and analysing results obtained. This database management system may be part of the integration module or may be executed on dedicated hardware without departing from the scope of the present disclosure.

Also in communication with the central messaging module 100 is a central file server 110. It would be appreciated that this central file server 110 may store the associated files transmitted to, from and between participants in the group conversations facilitated by the messaging platform of the present disclosure.

The central messaging module 100 may also be communicatively coupled with a message server 120 on which the messages transmitted to, from and between the user accounts on the platform may be stored as is discussed in more detail below. Finally, the central messaging module 100 may be communicatively coupled with an administration module 130 which in turn is coupled to an application programming interface server module 132 by which third party developers 142 may interact with those central messaging module 100. Similarly, the administration module 130 is in communication with an administration interface 134 by which an administrator 144 may look after administrative functions of the central messaging platform.

These administrative functions may include but are not limited to creation, addition, modification of user profiles on the central messaging module; management of the association of users with additional address identifier information and management and administration of groups and administration of groups.

Daily operations of the central messaging platform 50 may be performed by an internal user 140 operating an application using standard hardware such as a keyboard mouse, touchscreen etc.

Figure 2A:
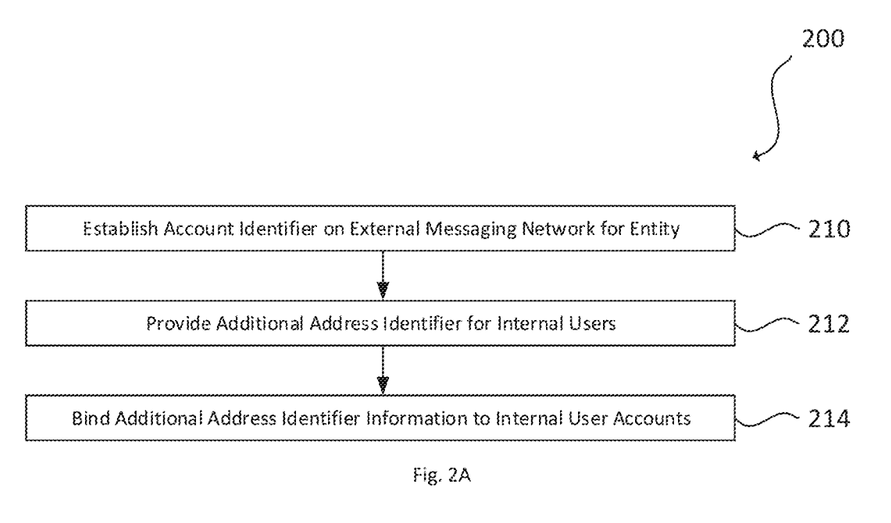
FIG. 2A depicts in outline the steps in initialising the system for receiving messages from an external account on one or more messaging applications.

Referring now to FIG. 2A, there is depicted an exemplary flowchart 200 outlining the steps in initialising the present platform. As depicted, a unique account identifier for the entity is established at 210 on the or each external messaging network the entity wishes to use to communicate with external individuals or companies. This unique account identifier may be selected and specified by the entity itself or assigned by the platform in a manner known to persons skilled in the art without departing from the scope of the present disclosure.

Additional address identifier information may be optionally supplied for the internal users by an administrator in step 212, in the form of text (name, position), image, keywords, tags or similar. This additional information may be stored by the central messaging module against specific individual accounts as described above with respect to FIG. 1 in step 214.

Figure 2B:
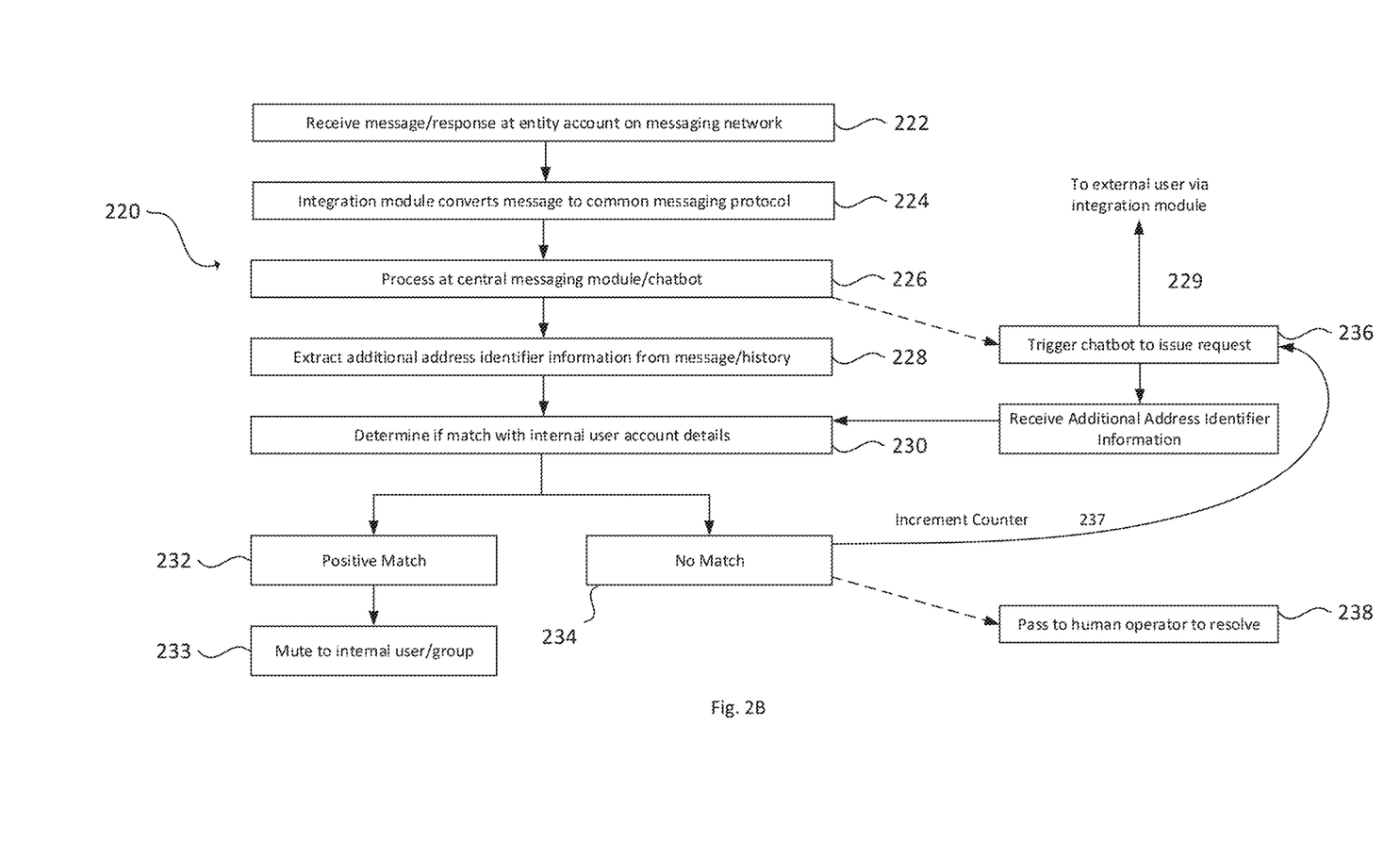
FIG. 2B depicts in outline the steps for routing messages received from an external account on the one or more messaging applications.

Referring now to FIG. 2B, there is depicted an exemplary flowchart 220 outlining the various steps in processing a message which has been received by the system. At step 222, an initial message is sent by a user (e.g. User A of FIG. 1) on a Messaging Network (e.g. Messaging Network One) and received on the external entity account established on this network.

At step 224, the integration module for this messaging network converts the message to a common internal messaging protocol used within the entity based on mapping fields of the specific messaging application to corresponding or equivalent fields in a common internal messaging network.

This message is then transmitted to the central messaging module, optionally via a chatbot 150 where it may be further processed by the central messaging module in step 226.

One aspect of such processing which may be carried out in the chatbot or the central messaging module is the extraction of potential additional address identifier information from the message in step 228. The extracted potential additional address identifier information may then be compared against address account identifier information which has already been stored for any internal users in step 230.

If a positive match is determined at step 232, the message can be transmitted by the central messaging module (or passed to the central messaging module from the chatbot) for transmission to the appropriate internal user account (or group of internal user accounts) for response handling in step 238.

If no match for the possible additional address identifier information is located for any internal users (or only a partial match and a number of possibilities may still exist) as depicted in step 234, the message can be passed trigger a further "enquiry" chatbot or other program, which requests additional information from the external user in step 236. A counter may also be incremented for tracking purposes step 237.

For example, if the external user is writing to the external address of an entity, supplies address information in the body of the message "Dear John Smith" (and there are two "John Smiths" at the entity), further information may be requested by the chatbot in step 236—for example asking for the middle name, department or extension of the desired addressee. For the first such request, the counter may be incremented to "one".

This request may be transmitted back to the external user in step 229 on the external messaging network from the entity ID, being transmitted via the integration module of the same messaging platform as the external user.

If additional potential address identifier information is identified via the chatbot or program in the message (or subsequently supplied by the external user in response to a request), then it can return back to a possible matching step 230.

In the event that no match can be located; then the counter can be incremented further 237; and once a certain number of iterations have occurred, then the message can be routed to a designated operator for further handling in step 238.

Assuming that an internal user can be located with the additional address identifier information (either in the body of the message or alternatively supplied in response to a request by the external user), the conversation and flow of messages between the external user account on the specified messaging platform, the corresponding integration module and the internal user account may continue for the duration of the "conversation"—which may be defined for a predetermined amount of time (e.g. 1 day, 1 week etc.), or until certain escape or break sequence of characters are transmitted by the internal user.

In this way, the system may be configured such that subsequent messages in a communication between an internal user and an external user are routed similarly, without requiring extraction of additional address identifier information for each message, which could potentially avoid introducing processing delays.

Figure 3A:
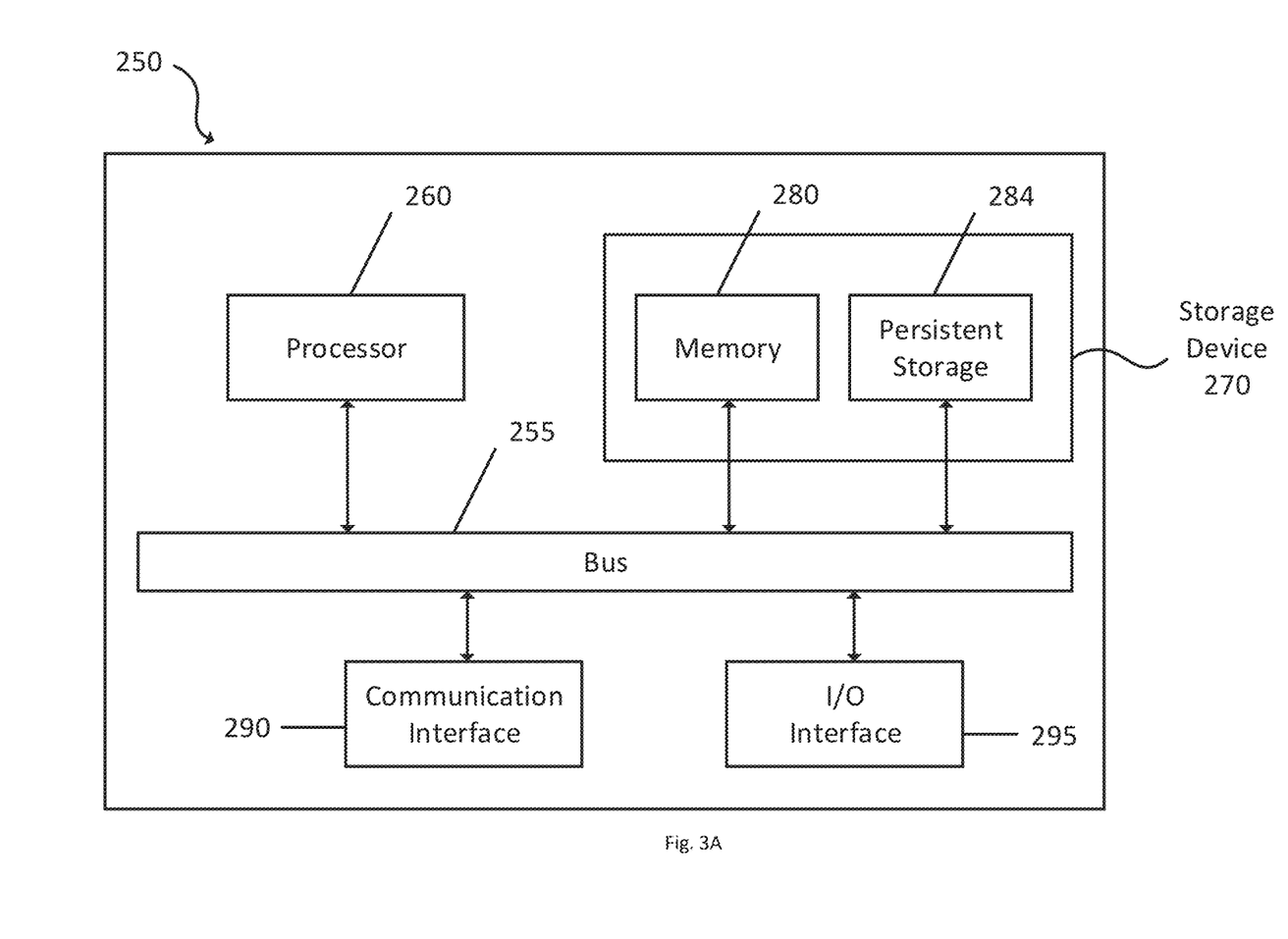
FIG. 3A depicts an exemplary architecture for a device or device(s) for providing a messaging platform operable by internal user(s) a third party developers or administrator(s) according to various embodiments of the present disclosure.

FIG. 3A depicts an exemplary architecture for a device or device(s) 250 for providing a messaging platform 50 operable by an internal user, a third party developer or an administrator according to various embodiments of the present disclosure.

The device 250 may be a single standalone device, or a device providing server functionality (for example, a gateway server), on which one or more database servers are also operable. Alternatively, device 250 could comprise multiple machines, for example, a server communicatively connected to one or more database servers and other modules. In still further embodiments, device 250 and databases and modules may be entirely provided on a cloud computing platform.

As depicted in FIG. 3A, device 250 includes a bus 255 for supporting communication between at least one processor 260, at least one storage device(s) 270, at least one communications interface 290, and at least one input/output (I/O) interface 295.

The processor 260 executes instructions that are stored in a memory 280. The processor 260 may include any suitable number(s) and type(s) of processors or other devices in any suitable arrangement. Example types of processors 260 include microprocessors, microcontrollers, digital signal processors, field programmable gate arrays, application specific integrated circuits, and discrete circuits.

The memory 280 and a persistent storage 284 are exemplary storage devices 270 indicative of structure(s) capable of storing and facilitating retrieval of information (such as data, program code, or other suitable information on a temporary or permanent basis). The memory 280 can be a random access memory or any other suitable volatile or non-volatile storage device(s). The persistent storage 284 may comprise one or more components or devices supporting longer-term storage, including databases or interfaces to databases embodied on separate machines and/or may include a read only memory, hard drive, Flash memory, or optical disc(s).

The communication interface 290 provides communications with other systems or devices. For example, the communications interface 290 could include a network interface card or a wireless transceiver facilitating communications over the network. The communications interface 290 may be configured to support communications through any suitable physical or wireless communication link(s).

The I/O interface 295 provides input and output of data. For example, the I/O interface 295 can provide a connection for user input through a keyboard, mouse, keypad, touchscreen, or other suitable input device. The I/O interface 295 can also send output to a display, printer, or other suitable output device.

Figure 3B:
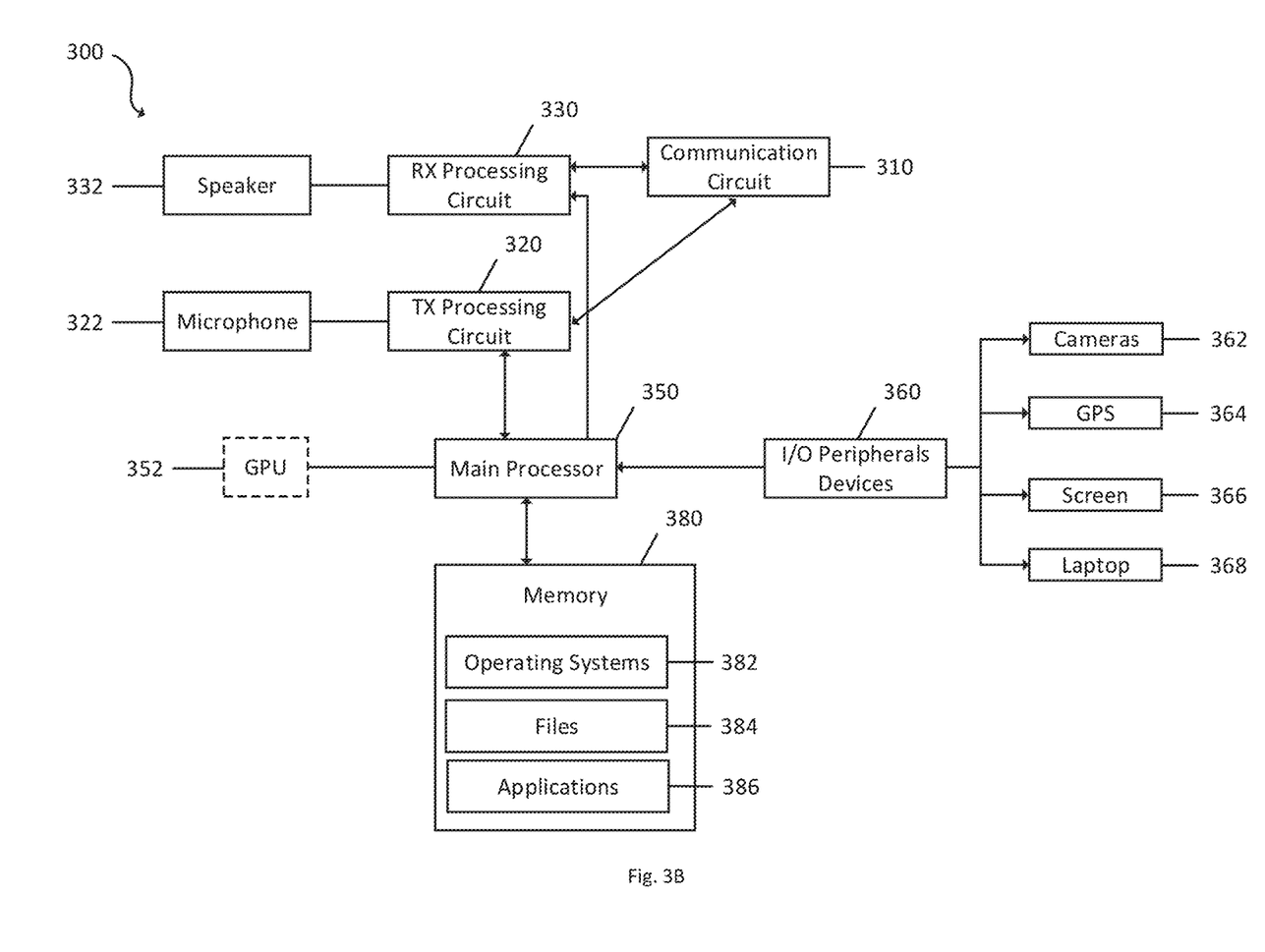
FIG. 3B depicts an exemplary architecture of an electronic device on which a user may install one or more messaging applications, creating or logging into their user account established on the specific messaging application.

FIG. 3B depicts a non-limiting example of an electronic device on which a user may install one or more messaging applications, creating or logging into their user account established on the specific messaging application. This user account on the electronic device may then communicate via third party applications with the central messaging platform as depicted in FIG. 1.

It would be appreciated that FIG. 3B is merely exemplary and non-limiting example of such an electronic device; and other configurations would also be possible.

As shown in the exemplary device depicted in FIG. 3B, the device 300 may include a communication unit 310, transmission (TX) processing circuitry 320, a microphone 322, and receiving (RX) processing circuitry 330. The device depicted 300 also includes a speaker 332, a main processor 350, an input/output (I/O) interface (IF) 360, input/output device(s), and a memory 380.

The memory 380 depicted includes an operating system (OS) program 382, file storage 384 and application files 386. The memory 380 is coupled to the main processor 350 and may include a random access memory (RAM) part, and as well as Flash memory or other read-only memory (ROM) part.

The communication unit 310 is configured to receive an incoming RF signal, for example, a near field communication signal such as a BLUETOOTH® or WI-FI™ signal. The communication unit 310 converts the incoming RF signal and provides the signal to the RX processing circuitry 330. This circuitry generates a processed baseband signal by filtering, decoding, or digitizing the signal; transmitting the processed signal to the speaker 332 (such as for voice data) or to the main processor 350 for further processing (such as for web browsing data, notification data, or other message data).

The TX processing circuitry 320 receives analog or digital voice data from the microphone 322 or other outgoing baseband data (such as web data, e-mail, or interactive video game data) from the main processor 350. The TX processing circuitry 320 encodes, multiplexes, or digitizes the outgoing baseband data to generate a processed signal. The communication unit 310 receives the processed signal from the TX processing circuitry 320 and converts this signal to an RF signal for transmission.

The main processor 350 can include one or more processors or other processing devices and execute the operating system 382 stored in the memory 380 in order to control the overall operation of the device 300. For example, the operating system executing on the main processor 350 may control reception of forward channel signals and the transmission of reverse channel signals by the communication unit 310, the RX processing circuitry 330, and the TX processing circuitry 320 as is known in the art, and usually includes at least one microprocessor or microcontroller.

The main processor 350 executes processes and programs retrieved/sent to and from the memory 380. In some embodiments, the main processor 350 is configured to execute the applications 386 based on the OS program 382 separately, or together with or in addition to response to input from a user of the applications 386. The main processor 350 may also be coupled to the I/O interface 360, to receive these user inputs and input from other hardware of additional devices or other devices such as laptop computers and handheld computers.

The main processor 350 depicted is also coupled to multiple the input/output sources, for receiving data and commands from the operator. Input/output device(s) can include keyboards, touch screens, or other devices providing interaction with the electronic device 300 to the user. In some embodiments, input/output device(s) can include a touch panel, a virtual reality headset, a (digital) pen sensor, a key, or other input device.

Input/output device(s)s can include one or more screens 366, which can be a liquid crystal display, light-emitting diode (LED) display, an optical LED (OLED), an active matrix OLED (AMOLED), or other screens providing graphics.

Although FIG. 3B illustrates one example of a device 300 for providing a messaging application, it would be appreciated that this arrangement is exemplary, and the device could include any number of components in any suitable arrangement. In general, devices including computing and communication systems come in a wide variety of configurations, and FIG. 1 does not limit the scope of this disclosure to any particular configuration.

It would be appreciated that present system and method facilitates centralised storage and monitoring of multiple messaging platforms used across a company. External participants are not bound to a single messaging network, but at the same time employees can use secure and compliant applications, which can be monitored by the employer to communicate on various messaging platforms. Furthermore, as described in the present disclosure, the data comprising these communications can be retained and analysed by the company, rather than being confined to the devices taking part in the conversation as is the case with pre-existing arrangements.

This is particularly important for industries such as investment, legal or banking industries which or other regulated/self-regulated industries in which it is useful/necessary to be able to store records of transactions.

Advantageously, internal users of the system and method of the present disclosure do not need to worry about which external messaging platform the external user on the other side of the conversation is communicating from; due to the integration modules and common internal messaging platform, which simplifies the administration by the entity. Furthermore, there is no need for designated personnel to be assigned to monitoring the incoming messages from specific messaging applications on behalf of the entity. Optionally there may be some employees assigned as second level support to the system for receiving messages which are unable to be routed after a number of attempts, although it is envisaged that such messages would decline in number as more detailed account identifier information is included.

The present system and method provides a scalable, traceable and adaptable approach by which organisations facilitate conversations with external users across multiple messaging platforms, centralised storage and monitoring yet at the same time not requiring any significant additional effort to be undertaken by the external users.

The above embodiments are described by way of example only. Many variations are possible without departing from the scope of the invention as defined in the appended claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system for routing messages received from any one of a plurality of external user accounts on any one of a plurality of different messaging applications to any one of a plurality of internal user accounts within an entity, the system comprising:
   one or more integration modules coupled to each of the plurality of different messaging applications for receiving messages via the messaging application, wherein the messages are received from the plurality of external user accounts and are directed to a unique account identifier for the entity assigned thereon; and
   a central messaging module configured to:
      receive from each of the one or more integration modules the messages via a common internal messaging protocol of the entity,
      compare a target recipient of the messages to identifier information of the plurality of internal user accounts to identify a match,
      in accordance with identifying the match, distribute the messages to the respective internal user accounts within the entity using additional address identifier information, and
      in accordance with not identifying the match after a predetermined threshold number of attempts, forward the messages to an administrative operator.

2. A system for routing messages within an entity according to claim 1, wherein at least a portion of the additional address identifier information is extracted from a message payload of the message sent to the unique account identifier of the entity by each messaging application.

3. A system for routing messages within an entity according to claim 2, wherein the portion of the additional address identifier information comprises text, image, sound or video data included in the payload of the message sent to the unique account identifier of the entity.

4. A system for routing messages within an entity according to claim 1, wherein at least a portion of the additional address information is provided from the originating external user account of the messaging application responsive to a request issued by the one or more integration modules coupled thereto.

5. A system for routing messages within an entity according to claim 4, wherein the request is issued by a chatbot communicatively coupled to the one or more integration modules.

6. A system for routing messages within an entity according to claim 1, wherein the additional address identifier information is derived from additional information provided by at least one of the plurality of external user accounts.

7. A system for routing messages within an entity according to claim 1, wherein internal user account address identifier information for the plurality of internal user accounts within the entity is stored in a database.

8. A system for routing messages within an entity according to claim 1, wherein the system stores on a message server coupled to the central messaging module, each message received from the plurality of external user accounts and sent to the plurality of internal user accounts.

9. A system for routing messages within an entity according to claim 1, wherein each message transmitted from the plurality of internal user accounts and sent to the plurality of external user accounts are stored on a message server coupled to the central messaging module.

10. A system for routing messages within an entity according to claim 1, wherein a subsequent message received from a specific external user account of a messaging application of the plurality of different messaging applications is routed according to one or more internal user accounts identified for previous messages originating therefrom.

11. A method for routing messages received from any one of a plurality of external user accounts on any one of a plurality of different messaging applications to any one of a plurality of internal user accounts within an entity, the method comprising:
   receiving a message sent to a unique address for the entity on one of the plurality of different messaging applications at one or more integration modules coupled to the messaging application; and
   at a central messaging module:
      receiving the message from the one or more integration modules via a common internal messaging protocol of the entity,
      comparing a target recipient of the message to identifier information of the plurality of internal user accounts to identify a match,
      in accordance with identifying the match, distributing the message to the respective internal user accounts within the entity using additional address identifier information, and
      in accordance with not identifying the match after a predetermined threshold number of attempts, forwarding the message to an administrative operator.

12. The method for routing messages within an entity according to claim 11 wherein at least a portion of the additional address identifier information is extracted from a message payload of the message sent to the unique account identifier of the entity by each messaging application.

13. The method for routing messages within an entity according to claim 12, wherein the portion of the additional address identifier information comprises text, image, sound, or video data included in the payload of the message sent to the unique account identifier of the entity.

14. The method for routing messages within an entity according to claim 11, wherein at least a portion of the additional address information is provided from the originating external user account of the messaging application responsive to a request issued by the one or more integration modules coupled thereto.

15. The method for routing messages within an entity according to claim 14, wherein the request is issued by a chatbot communicatively coupled to the one or more integration modules.

16. The method for routing messages within an entity according to claim 11, wherein the additional address identifier information is derived from additional information provided by at least one of the plurality of external user accounts.

17. The method for routing messages within an entity according to claim 11, further comprising storing internal user account address identifier information for the plurality of internal user accounts within the entity in a database.

18. The method for routing messages within an entity according to claim 11, further comprising storing on a message server coupled to the central messaging module, each message received from the plurality of external user accounts and sent to the plurality of internal user accounts.

19. The method for routing messages within an entity according to claim 11, further comprising storing on a message server, coupled to the central messaging module, each message transmitted from the plurality of internal user accounts and sent to the plurality of external user accounts.

20. The method for routing messages within an entity according to claim 11, wherein a subsequent message received from a specific external user account of a messaging application of the plurality of different messaging applications is routed according to one or more internal user accounts identified for previous messages originating therefrom.

21. A non-transitory computer readable medium for routing messages received from any one of a plurality of external user accounts on any one of a plurality of different messaging applications to any one of a plurality of internal user accounts within an entity, the non-transitory computer readable medium having encoded upon it instructions executable by the message processing system to perform process steps comprising:

receiving a message sent to a unique address for the entity on one of the plurality of different messaging applications at one or more integration modules coupled to the messaging application;

at a central messaging module:
    receiving the message from the one or more integration modules via a common internal messaging protocol of the entity,
    comparing a target recipient of the message to identifier information of the plurality of internal user accounts to identify a match,
    in accordance with identifying the match, distributing the message to the respective internal user accounts within the entity using additional address identifier information, and
    in accordance with not identifying the match after a predetermined threshold number of attempts, forwarding the message to an administrative operator.

* * * * *